May 21, 1963
H. E. KLINGLER
3,090,410
FILLER SPOUT AND SAFETY CLOSURE FOR MOBILE WATER SYSTEMS
Filed May 17, 1961
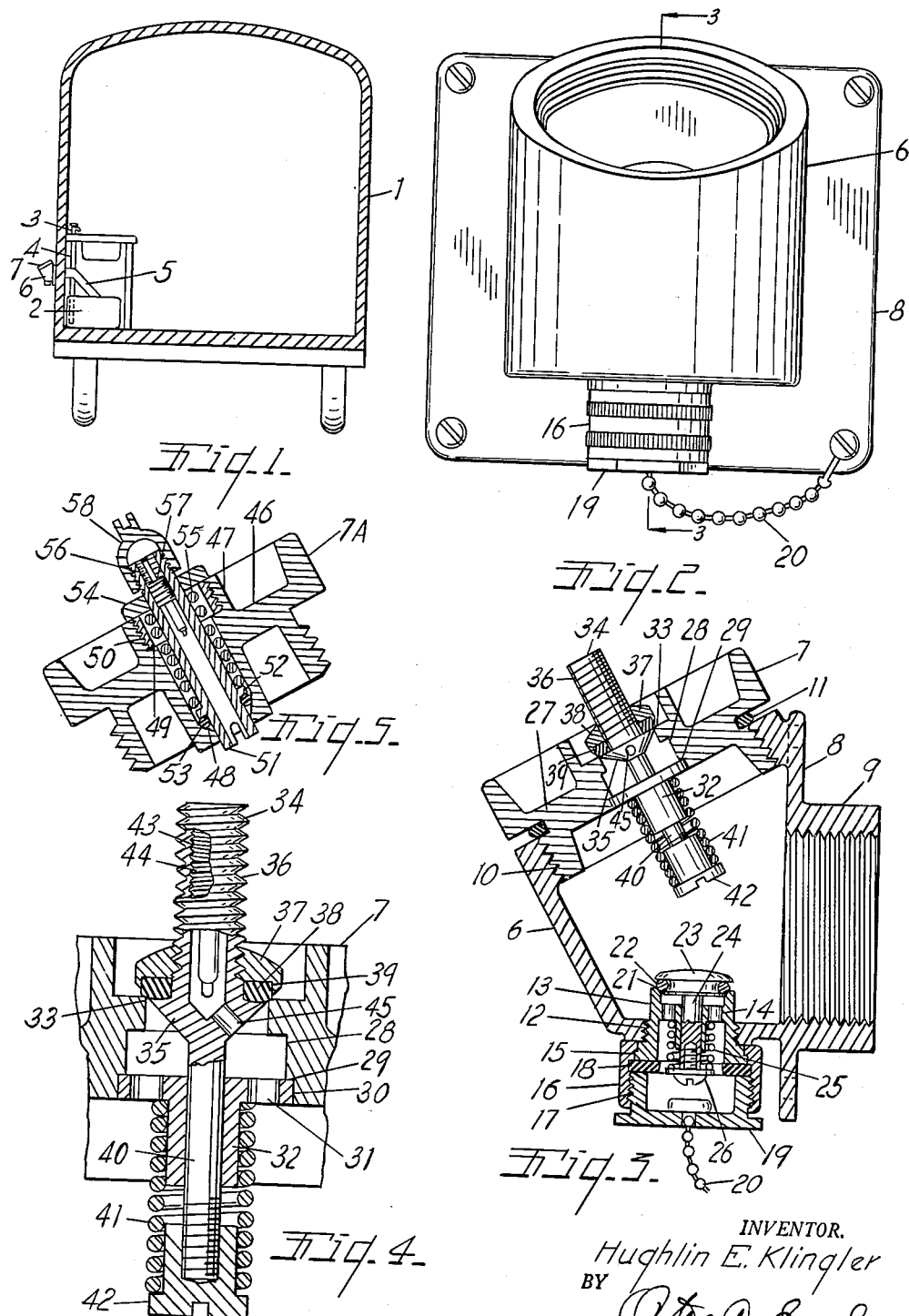
INVENTOR.
Hughlin E. Klingler
BY
ATTORNEY.

United States Patent Office 3,090,410
Patented May 21, 1963

3,090,410
FILLER SPOUT AND SAFETY CLOSURE FOR MOBILE WATER SYSTEMS
Hughlin E. Klingler, 223 Arcade Ave., Elkhart, Ind.
Filed May 17, 1961, Ser. No. 110,719
14 Claims. (Cl. 141—302)

This invention relates to improvements in filler spout and safety closure for mobile water systems. The principal objects of this invention are:

First, to provide a filler spout and cap for a pressure water system of a mobile vehicle such as a trailer which will permit easy alternative changing of the system from city water systems or by gravity pouring and alternative pressurizing of the system by hand or powered air pump, all with a dependable safety pressure relief valve to prevent damage to the system by excess pressure from any source.

Second, to provide a filler spout attachment which may be mounted on the outside of a trailer to provide a connection for a domestic water hose and a wire mouth opening for receiving water by gravity and cap for the wide opening having an air inlet connection and valve cooperative with automobile service station air hoses for building up pressure in the system.

Third, to provide a combined air inlet chesk valve and safety outlet valve for a pressurized water system which will effectively admit and retain a predetermined maximum pressure but release pressure in excess of the maximum.

Fourth, to provide a novel filler spout and cap which facilitates the filling and use of a pressurized water system in a trailer or other mobile vehicle.

Other objects and advantages of the invention will be apparent from a consideration of the following description and claims. The drawings, of which there is one sheet, illustrate a highly practical form of the filler spout and cap and one modified form of cap for the spout.

FIG. 1 is a fragmentary vertical cross sectional view conventionally illustrating a trailer with a water system and the filter spout of the invention mounted therein.

FIG. 2 is an enlarged side elevational view of the body of the filler spout shown in FIG. 1 with the closure cap removed.

FIG. 3 is a vertical cross sectional view taken along the plane of the line 3—3 in FIG. 2 and including the closure cap.

FIG. 4 is a further enlarged fragmentary cross sectional view showing the air inlet valve and safety relief valve shown in FIG. 3.

FIG. 5 is a cross sectional view through a modified form of closure cap and inlet valve and safety valve assembly.

Many passenger vehicles are now provided with pressurized water systems for the convenience of the passengers. Particularly for smaller vehicles such as pleasure boats, vacation or travel trailers, airplanes and busses, it is inconvenient to provide a pump or power source for pressurizing the system. Pressure to distribute the water through the system may be supplied by hand air pump or service station compressor and stored as air pressure in the water supply tank. The present invention provides a filler spout and pressure retaining closure that permits alternative operation of the mobile water system by temporary connection to a public water system, or by gravity filling with water and creation of air pressure by either manual or powered air pump. In the example illustrated a travel trailer conventionally illustrated in cross section at 1 is provided with a water storage and pressure tank 2 connected to an outlet such as a faucet 3 by the pipe 4. A filler tube 5 is sealed to the tank and provided with a filler spout 6 on the outside of the trailer. The filler spout embodies the details of the invention as will be described and is provided with a pressure retaining cap 7 to retain water distributing pressure in the system.

As appears more clearly from FIGS. 2 and 3, the spout 6 is a chambered body having a mounting flange 8 for attachment to the wall of the trailer and a neck 9 for attachment to the tube 5. The upper wall of the body is inclined outwardly from the flange and defines a threaded opening 10 cooperative with the cap 7. An O-ring seal 11 seals the cap to the spout body. In its bottom wall the body 6 defines an internally threaded opening 12 for receiving the hose coupling and check valve nipple 13.

The nipple 13 is a cylindrical member with a transverse spider and stem guide 14 in its center. A shoulder 15 on the outer end of the nipple swivelly retains a standard hose coupling ferrule 16 with an internal thread 17 for clamping the end of a standard garden hose against the gasket 18. When the hose connection is not in use a dust shield plug 19 attached to the flange by a chain 20 is threaded into the ferrule to retain the gasket and keep the inlet clean.

The inner end of the nipple 13 defines a seat 21 cooperative with a gasket 22 on the check valve 23. The stem 24 of the check valve is guided in the center of the guide and spider 14 and urged downwardly to closed position by the spring 25 bearing against the washer and screw 26 secured in the lower end of the stem. With the cap 7 sealed and a hose connected to the nipple 13, the system can obviously operate under commercial water pressure and from the commercial water supply. The hose can easily be detached leaving the tank full for use at a remote location.

The upper cap 7 has a transverse wall 27 with a bore 28 therethrough. The bore is inwardly shouldered at 29 to receive the spider 30 having air holes 31 therein and a central cylindrical stem guide 32. The outer end of the bore defines an annular safety valve seat 33. The safety valve cooperative with the seat 33 is a rod-like element 34 with an external conical boss 35 sized to just pass through the the seat 33. The outer end of the element 34 is externally threaded at 36 to receive the nut 37. When the nut 37 is threaded inwardly to the end of the thread 36 it clampingly retains a deformable seal ring 38 between itself and the base of the boss 35. Desirably the face of the nut or the boss or both are axially recessed slightly as at 39 to retain the seal ring against radial expansion. The seal ring seats against the seat 33.

The inner stem end 40 of the valve element 34 is slidably guided by the guide 32 and is biased inwardly to valve closing position by a spring 41 bearing against the cap 42 adjustably threaded on the inner end of the stem. The valve 34 is thus normally closed to retain distribution pressure in the system but should this pressure become excessive for any reason, the pressure acting through the holes 31 against the cone 35 unseats the valve and relieves the excess pressure.

The valve element 34 is axially bored and internally threaded from the outer end as at 43 to receive the standard pneumatic tire check valve and stem 44. The outer end of the valve element 34 may in fact be identical with a tire valve stem to cooperate with standard automotive air pressure nozzles and the screw-on fittings of manual air pumps. At its inner end the bore 43 communicates through the port 45 with the bore 28 so that air pressure delivered from either a manual pump or automatic pump or tank will be transmitted through the cap to pressurize the water tank 2. The check valve 23 at the hose inlet of course seals and retains this pressure. Any abnormally high pressure admitted through the valve 44 will be immediately relieved by unseating of the safety valve at the cone 35 and seal 38.

With the foregoing structure, the tank 2 and water system of the vehicle can be operated from a hose already described. Alternatively it can be filled with a hose or even a bucket by pouring through the upper opening 10. When filled, the tank can be pressurized by replacing the cap 7 and introducing air under pressure through the valve 44, either from a commercial air pump if available or a hand pump as when the trailer is in use at a country camp site.

The modified form of cap 7A shown in FIG. 5 may be used in place of the first form of cap 7. It has a transverse wall 46 with a tubular boss 47 projecting inwardly and outwardly therefrom. The boss has a first inner shoulder 48 adjacent its inner end and an outer shoulder 49 located at the inner end of an internal thread 50. A tubular valve element 51 extends through the boss 47 and is slidably guided at its inner end in the inner shoulder 48. A flange or collar 52 on the valve element presses a deformable seal ring 53 against the inner shoulder 48. A cap 54 adjustably threaded into the thread 50 guides the outer end of the valve element and adjustably compresses the spring 55 against the flange 52 to complete an outwardly opening safety valve.

The tubular valve element 51 is internally threaded at its outer end as at 56 and provided with a standard tire check valve 57. A standard valve stem cap 58 fits on the outer end of the valve element. It will be apparent that a standard air pump or nozzle can be applied to the end of the valve element 51 to charge the tank and water system with pressure. In the event that the pressure in the system exceeds a preset maximum, the tubular valve element moves outwardly against the pressure of spring 55 to unseat the seal 53 and relieve the excess pressure.

What is claimed as new is:

1. In a combination with a mobile vehicle having a pressurized water system with a tank and a filler tube connected thereto,
   a filler spout connected to said tube and mounted on an outside wall of the vehicle,
   a hose connection nipple opening through the bottom of said spout and having a threaded ferrule adapted to connect a hose to the spout,
   an outwardly seating check valve cooperative with the inner end of said nipple,
   the top of said spout defining an inclined internally threaded filler opening substantially wider than said nipple,
   a cap removably sealed in said opening and having an internally shouldered bore formed therethrough with a safety valve seat around the outer end of the bore,
   a valve rod extending through said bore and having a conical shoulder opposite said seat,
   a spider seated against the shoulder in said bore and guidingly receiving the inner end of said rod,
   a nut threaded on the outer end of said rod and clamping a deformable sealing ring against the shoulder on the rod in cooperative relation to said seat,
   a cap adjustable on the inner end of said rod,
   a spring compressed between said cap and said spider,
   the outer end of said rod having an internal bore formed therein with an outwardly seating check valve therein,
   and the mid-section of said rod having a part formed therein communicating between the inner end of said internal bore and said bore in said cap inwardly of said sealing ring.

2. In a combination with a mobile vehicle having a pressurized water system with a tank and a filler tube connected thereto,
   a filler spout connected to said tube,
   a hose connection nipple opening through the bottom of said spout and adapted to connect a hose to the spout,
   an outwardly seating check valve cooperative with said nipple,
   the top of said spout defining an internally threaded filler opening substantially wider than said nipple,
   a cap removably sealed in said opening and having an internally shouldered bore formed therethrough with a safety valve seat around the outer end of the bore,
   a valve rod extending through said bore and having a conical shoulder opposite said seat,
   a spider seated against the shoulder in said bore and guidingly receiving the inner end of said rod,
   a nut threaded on the outer end of said rod and clamping a deformable sealing ring against the shoulder on the rod in cooperative relation to said seat,
   a cap adjustable on the inner end of said rod,
   a spring compressed between said cap and said spider,
   the outer end of said rod having an internal bore formed therein with an outwardly seating check valve therein,
   and the mid-section of said rod having a port formed therein communicating between the inner end of said internal bore and said bore in said cap inwardly of said sealing ring.

3. In a combination with a mobile vehicle having a pressurized water system with a tank and a filler tube connected thereto,
   a filler spout connected to said tube and mounted on an outside wall of the vehicle,
   a hose connection nipple opening through a wall of said spout and having a threaded ferrule adapted to connect a hose to the spout,
   an outwardly seating check valve cooperative with the inner end of said nipple,
   the wall of said spout defining an inclined and threaded filler opening substantially wider than said nipple and spaced therefrom,
   a cap removably sealed in said opening and having an internally shouldered bore formed therethrough with a safety valve seat around the outer end of the bore,
   a valve rod extending through said bore and having a shoulder opposite said seat,
   a spider seated against the shoulder in said bore and guidingly receiving the inner end of said rod,
   a deformable sealing ring on the shoulder on the rod in cooperative relation to said seat,
   a cap adjustable on the inner end of said rod,
   a spring compressed between said cap and said spider,
   the outer end of said rod having an internal bore formed therein with an outwardly seating check valve therein,
   and the mid-section of said rod having a port formed therein communicating between the inner end of said internal bore and said bore in said cap inwardly of said sealing ring.

4. In a combination with a mobile vehicle having a pressurized water system with a tank and a filler tube connected thereto,
   a filler spout connected to said tube and mounted on an outside wall of the vehicle,
   a hose connection nipple opening through a wall of said spout and having a threaded ferrule adapted to connect a hose to the spout,
   an outwardly seating check valve cooperative with the inner end of said nipple,
   the wall of said spout defining a threaded filler opening substantially wider than said nipple and spaced therefrom, a cap removably sealed over said opening and having an internally shouldered bore formed therethrough with a safety valve seat around the outer end of the bore, a valve rod extending through said bore and having a shoulder opposite said seat, a spider seated against the shoulder in said bore and guidingly receiving the inner end of said rod, a deformable sealing ring on the shoulder on the rod in cooperative relation to said seat, a cap adjustable on the inner end of said rod, a spring compressed between said cap and said spider, the outer end of said rod having an internal bore formed therein with an outwardly seating check valve therein, and the mid-section of said rod having a port formed therein communicating between the inner end of said internal bore and said bore in said cap inwardly of said sealing ring.

5. In a combination with a mobile vehicle having a pressurized water system with a tank and a filler tube connected thereto, a filler spout connected to said tube, a hose connection nipple opening through the wall of said spout and adapted to connect a hose to the spout, an outwardly seating check valve cooperative with said nipple, the wall of said spout defining a threaded filler opening substantially wider than said nipple and remote therefrom, a cap removably sealed over said opening and having a bore formed therethrough with a safety valve seat around the outer end of the bore, a valve rod extending through said bore and having a shoulder opposite said seat, a spider seated against an inwardly facing surface around said bore and guidingly receiving the inner end of said rod, the shoulder on the rod being in cooperative sealing relation to said seat, an abutment adjustable on the inner end of said rod, a spring compressed between said abutment and said spider, the outer end of said rod having an internal bore formed therein with an outwardly seating check valve therein, and the mid-section of said rod having a port formed therein communicating between the inner end of said internal bore and said bore in said cap inwardly of said seat.

6. A filler spout for a pressurized water system including a tank comprising a hollow chambered body with a laterally extending neck adapted to be connected to the tank and defining an upwardly facing and internally threaded filling opening, a nipple forming a second inlet to said body located in the bottom wall of the body and adapted to be connected to a supply hose, an outwardly closing check valve in said nipple, a removable cap closing said first opening, an air pressure inlet tube opening into said body through said cap and having an outwardly seating check valve in the tube, a seal carried by the exterior of said tube and seating inwardly against the portion of said cap surrounding said tube, and a spring compressed between said tube and said cap and biasing said seal to closed position as a safety valve.

7. A filler spout for a pressurized water system including a tank comprising a hollow chambered body with a laterally extending neck adapted to be connected to the tank and defining an upwardly facing and internally threaded filling opening, a nipple forming a second inlet to said body located in the bottom wall of the body and adapted to be connected to a supply hose, an outwardly closing check valve in said nipple, a removable cap closing said first opening, an air pressure inlet tube opening into said body through said cap and having an outwardly seating check valve in the tube, a projection carried by the exterior of said tube and seating inwardly against an exterior portion of said cap surrounding said tube, and a spring compressed between said tube and said cap inwardly of said projection and biasing said projection to closed position as a safety valve.

8. A filler spout for a pressurized water system including tank comprising a hollow chambered body with a laterally extending neck adapted to be connected to the tank and defining an upwardly facing threaded filling opening, a nipple forming a second inlet to said body located in a lower wall of the body and adapted to be connected to a supply hose, an outwardly closing check valve in said nipple, a removable cap closing said first opening, an air pressure inlet tube extending slidably between the interior and exterior of said body and opening into said body and having an outwardly seating check valve in the tube, a seal carried by the exterior of said tube and seating inwardly against the portion of said body surrounding said tube, and a spring compressed between said tube and said body and biasing said seal to closed position as a safety valve.

9. A filler spout for a pressurized water system including a tank comprising a hollow chambered body with a neck adapted to be connected to the tank and defining an upwardly facing threaded filling opening, a nipple forming a second inlet to said body and adapted to be connected to a supply hose, an outwardly closing check valve in said nipple, a removable cap closing said first opening, an air pressure inlet tube extending slidably between the interior and exterior of said body and opening into said body and having an outwardly seating check valve in the tube, a seal carried by the exterior of said tube and seating inwordly against a portion of said body surrounding said tube, and a spring bearing between said tube and said body and biasing said seal to closed position as a safety valve.

10. A filler spout for a pressurized water system including a tank, comprising a hollow body with a neck adapted to be connected to the tank and defining an upwardly facing threaded filling opening, a cap sealingly and removably engaged with said threaded opening and having an air inlet valve mounted therein, a hose coupling having an outwardly seating check valve mounted in a wall of said body to deliver fluid thereinto, and an outwardly opening safety valve formed as part of said air inlet valve extending through said body and spring biased inwardly thereof.

11. A filler spout for a pressurized water system including a tank, comprising a hollow body with a neck adapted to be connected to the tank and defining an upwardly facing threaded filling opening, a cap sealingly and removably engaged with said threaded opening and having an air inlet valve mounted therein, a hose coupling having an outwardly seating check valve mounted in a wall of said body to deliver fluid thereinto, and an outwardly opening safety valve extending through said body and spring biased inwardly thereof.

12. A pressure supply and pressure limiting safety valve assembly for a tank mounted in a removable closure for the tank comprising, means on said closure forming an opening adapted to communicate between the interior and exterior of said tank, a pressure inlet tube extending reciprocably through said opening and having an outwardly seating check valve in the passage through the tube, a radially projecting shoulder on the exterior of said tube, a deformable seal compressed against said shoulder by a nut threaded on said tube and seating inwardly against the edge of said opening, spider means removably seated against a shoulder positioned around the inner side of said opening and forming a stem guide, a stem on the inner end of said tube reciprocably received in said guide, a spring positioned around said stem inwardly of said spider means, and a nut on said stem adjustably compressing said spring against said spider means.

13. A pressure supply and pressure limiting safety valve assembly for a tank comprising, means forming an opening adapted to communicate between the interior and exterior of said tank, a pressure inlet tube extending reciprocably through said opening and having an outwardly seating check valve in the passage through the tube, a radially projecting shoulder on the exterior of said tube seating inwardly against the edge of said opening, spider means removably seated against a shoulder positioned around said opening and forming a stem guide, a stem on said tube reciprocably received in said guide, a spring positioned around said stem, and means adjustably compressing said spring against said spider means.

14. A pressure supply and pressure limiting safety valve assembly for an enclosure having a wall defining an opening with an inwardly facing shoulder around the inner side thereof comprising, a tube substantially smaller than said opening and extending through the opening, a radially enlarged collar on said tube coacting with the edge of said opening to form an inwardly seating seal, an outwardly seating check valve in said tube, a spider forming a stem guide seated against said shoulder, a stem on said tube guidingly received in said guide, a spring positioned around said stem, and a nut on said stem adjustably compressing said spring against said guide.

References Cited in the file of this patent

UNITED STATES PATENTS

| | | |
|---|---|---|
| 1,712,877 | Ehlers | May 14, 1929 |
| 2,951,502 | Norway et al. | Sept. 6, 1960 |